United States Patent
Huang (10) Patent No.: US 11,022,872 B2
(45) Date of Patent: Jun. 1, 2021

(54) PROJECTION SYSTEM (71) Applicants: BENQ CORPORATION, Taipei (TW); BenQ Intelligent Technology (Shanghai) Co., Ltd, Shanghai (CN)

(72) Inventor: Chen-Cheng Huang, Taoyuan (TW)

(73) Assignees: BENQ CORPORATION, Taipei (TW); BenQ Intelligent Technology (Shanghai) Co., Ltd, Shanghai (CN)

( * ) Notice: Subject to any disclaimer, the term of this patent is extended or adjusted under 35 U.S.C. 154(b) by 0 days.

(21) Appl. No.: 16/578,495

(22) Filed: Sep. 23, 2019

(65) Prior Publication Data
US 2020/0103738 A1 Apr. 2, 2020

(30) Foreign Application Priority Data
Sep. 27, 2018 (CN) .......................... 201811127220.5

(51) Int. Cl.
G03B 21/20 (2006.01)
G03B 21/00 (2006.01)

(52) U.S. Cl.
CPC ......... *G03B 21/206* (2013.01); *G03B 21/008* (2013.01); *G03B 21/208* (2013.01); *G03B 21/2066* (2013.01)

(58) Field of Classification Search
CPC .... G03B 21/008; G03B 21/28; G03B 21/206; G03B 21/208; G03B 21/2013; G03B 21/2033; G03B 21/2053; H04N 9/315; H04N 9/3105; H04N 9/3114; H04N 9/3132; H04N 9/3158
See application file for complete search history.

(56) References Cited

U.S. PATENT DOCUMENTS 5,548,422 A 8/1996 Conner et al.
7,677,740 B2 * 3/2010 Takeuchi ............. H04N 9/3155
353/97

(Continued)

FOREIGN PATENT DOCUMENTS

CN 1274093 A 11/2000
CN 101221346 A 7/2008

(Continued)

OTHER PUBLICATIONS

Office action of counterpart application by SIPO dated Jun. 10, 2020.

*Primary Examiner* — Sultan Chowdhury (57) ABSTRACT

A projection system includes a light source, a projection lens, and a light-adjusting diaphragm element. The light source emits a first light having a first dominant wavelength range and a second dominant wavelength range. The projection lens is disposed on the path of the first light. The light-adjusting diaphragm element, disposed between the light source and the projection lens, has an opening and a light shielding area outside the opening, a filter is disposed in the opening, wherein a part of the first light is blocked by the light shielding area, a wavelength band corresponding to the first dominant wavelength range of other part of the first light passes through the opening, and a wavelength band corresponding to the second dominant wavelength range of the other part of the first light is blocked by the filter to become a second light having a narrow wavelength range.

11 Claims, 5 Drawing Sheets

(56) References Cited

U.S. PATENT DOCUMENTS

| | | | |
|---|---|---|---|
| 8,011,791 B2 | 9/2011 | Hsiung et al. | |
| 2007/0064203 A1* | 3/2007 | Sawai | G03B 9/06 353/97 |
| 2007/0171646 A1* | 7/2007 | Kojima | G03B 21/208 362/268 |
| 2010/0118213 A1* | 5/2010 | Kato | G03B 21/20 348/750 |
| 2011/0310353 A1* | 12/2011 | Maeda | G03B 33/06 353/31 |
| 2015/0253654 A1* | 9/2015 | Hu | G03B 21/2013 353/31 |
| 2019/0018311 A1* | 1/2019 | Yamamoto | G01S 17/10 |

FOREIGN PATENT DOCUMENTS

| | | |
|---|---|---|
| CN | 103777257 A | 5/2014 |
| CN | 104062835 A | 9/2014 |
| CN | 105025280 A | 11/2015 |
| JP | 2007127795 A | 5/2007 |

* cited by examiner

PROJECTION SYSTEM

This application claims the benefit of People's Republic of China application Serial No. 201811127220.5, filed Sep. 27, 2018, the subject matter of which is incorporated herein by reference.

BACKGROUND OF THE INVENTION

Field of the Invention

The invention relates in general to a projection system, and more particularly to a projection system having a wide color gamut image output.

Description of the Related Art

In response to the trend of light, thin, short and small electronic products in the present market, the traditional projector started to be developed toward the miniaturization and high color performance. The mini projector is easy to be carried with, and the mini projector not only can be manufactured as a portable mini projector, but also can be applied to various present electronic products, such as being built in mobile phones, multimedia players, notebook computers, etc., to expand the functional diversity of the electronic products.

In the projection system, the optical element for adjusting the light of the light-emitting element for example is light valve, lens, etc., and the light valve may be a digital micro-mirror device (DMD) or a liquid crystal switch element. In order to achieve optical high-brightness performance, currently the mini projector uses light-emitting diode having three primary colors of red light, green light and blue light as a light source, and the light source projects the tricolor light onto the DMD for imaging.

However, in the color performance, if the yellow light energy is too high, the color coordinate position outputted from the green light will be affected, the color gamut of the image outputted from the projection system will be smaller, and the color outputted from the green light will be in shade of yellow. Therefore, the wide color gamut demand of the DCI-P3 color gamut standard specification cannot be satisfied.

SUMMARY OF THE INVENTION

The invention is directed to a projection system which may purify the image light to improve the color performance of the image light.

According to one aspect of the present invention, a projection system is provided. The projection system comprises a light source, a projection lens, and a light-adjusting diaphragm element. The light source is configured to emit a first light having a first dominant wavelength range and a second dominant wavelength range. The projection lens is disposed on the path of the first light. The light-adjusting diaphragm element is disposed between the light source and the projection lens, the light-adjusting diaphragm element has an opening and a light shielding area outside the opening, a filter is disposed in the opening, wherein a part of the first light is blocked by the light shielding area, a wavelength band corresponding to the first dominant wavelength range of other part of the first light passes through the opening, and a wavelength band corresponding to the second dominant wavelength range of the other part of the first light is blocked by the filter to become a second light, so that the second light has a narrow wavelength range with respect to the first light.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. The same/similar denotations are used to describe the same/similar elements in the description below.

Figure 2A:
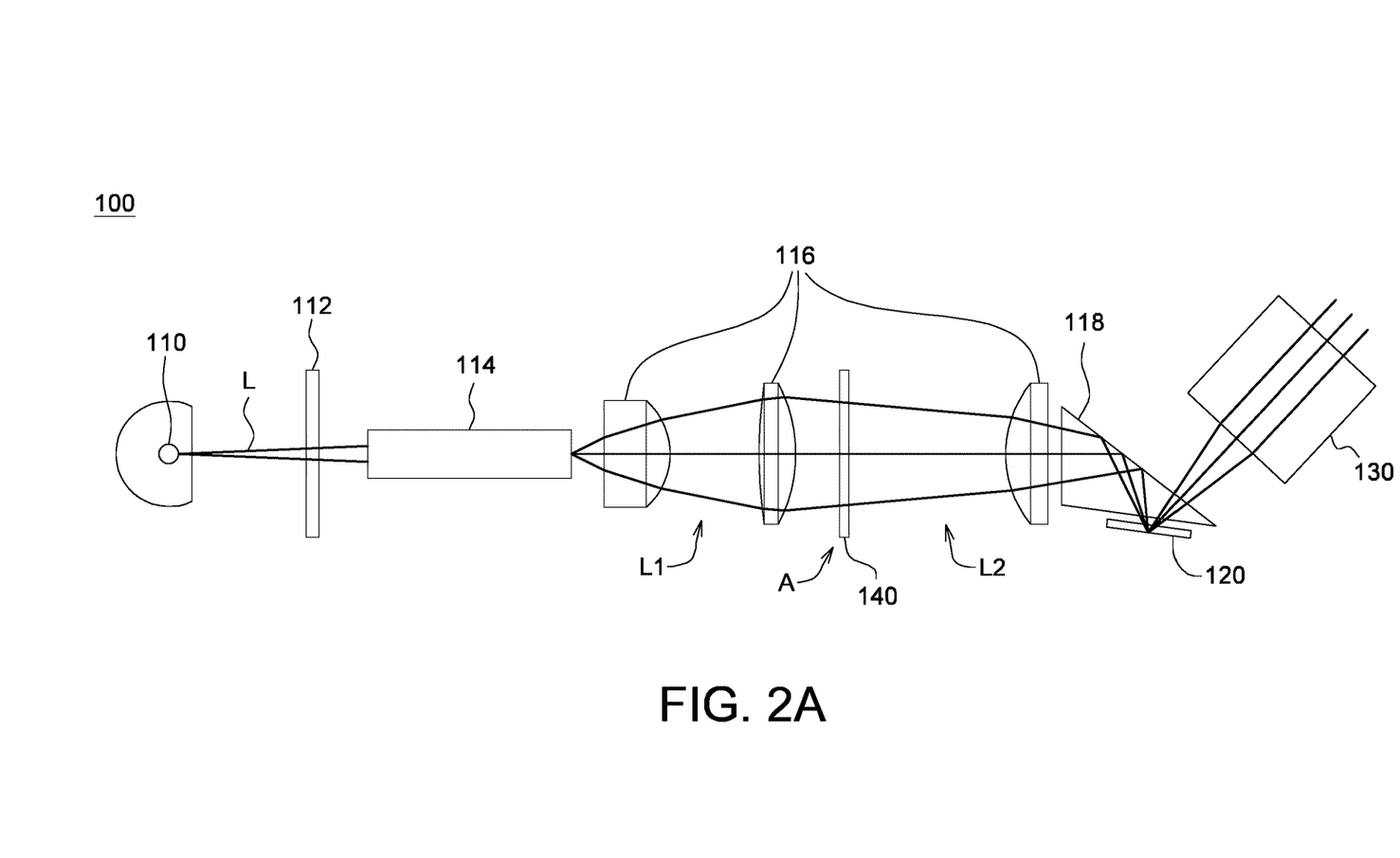
FIGS. 2A and 2B respectively are schematic diagrams of a projection system according to two embodiments of the present invention.

In present embodiment, a projection system is provided to project an image light on a screen. As shown in FIG. 2A, the projection system 100 comprises a light source 110, such as a light-emitting diode, a laser diode, a metal halide bulb, an UHE bulb or an UHP bulb, which is an element suitable for illumination or optical projection, and the elements are generally called a light-emitting element. In addition, the light emitted from the light-emitting element may be adjusted by the optical element which may comprise collimating lens, beam homogenizer (such as lens array, integration rod), and projection lens, etc. In addition, the light emitted from the light-emitting element may be adjusted by other elements, such as a filter device (e.g., a color wheel, a color filter), a beam splitter, a total internal reflection prism (TIR PRISM), a lens having diopter (e.g., field lens), or other optical elements which may adjust the light of the light-emitting element, such as a light valve or a diaphragm, and the diaphragm may be known as the aperture of lens.

The light valve may be a DMD, a liquid crystal switch element, or other elements or devices which can convert the light emitted from the light-emitting element into an image light and can be electrically driven, and is commonly applied in digital projection system.

Figure 2B:
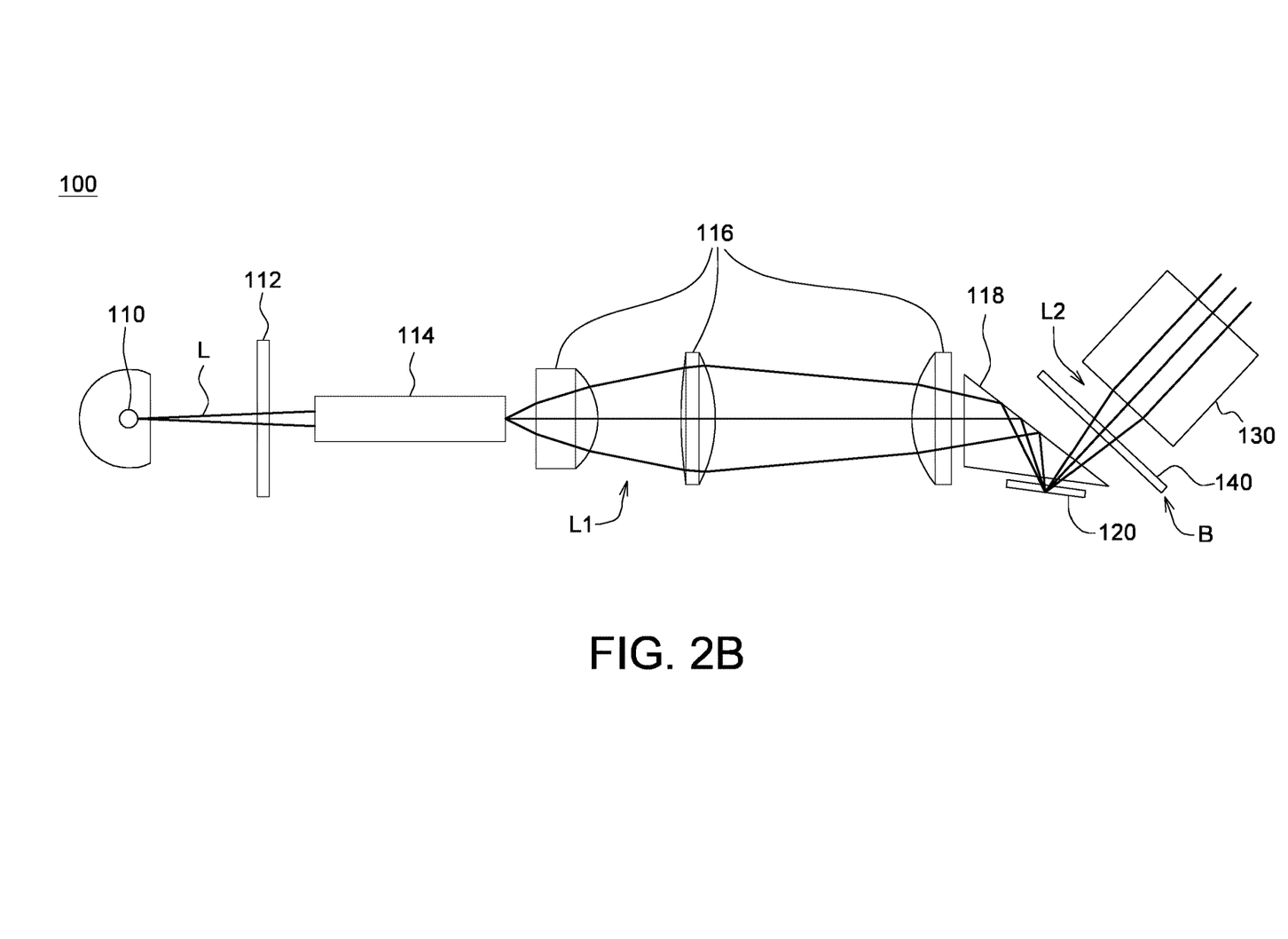

The diaphragm is disposed behind the lens, and is used for limiting the diameter size of the beam passing through the lens. In general, the diaphragm has a reduction effect on the edge energy of an input light, so that the edge energy of the input light is reduced to avoid from being too high to affect the contrast. Referring to FIGS. 2A and 2B, in the projection system 100 of the present invention, by disposing light-adjusting diaphragm element 140 in a suitable light path, the wavelength band of the specific dominant wavelength range passes through the opening 142, and the wavelength band of another dominant wavelength range is blocked (e.g., filtered out by the filter 143), to purify the image light and improve the color performance of the image light.

Figure 4:
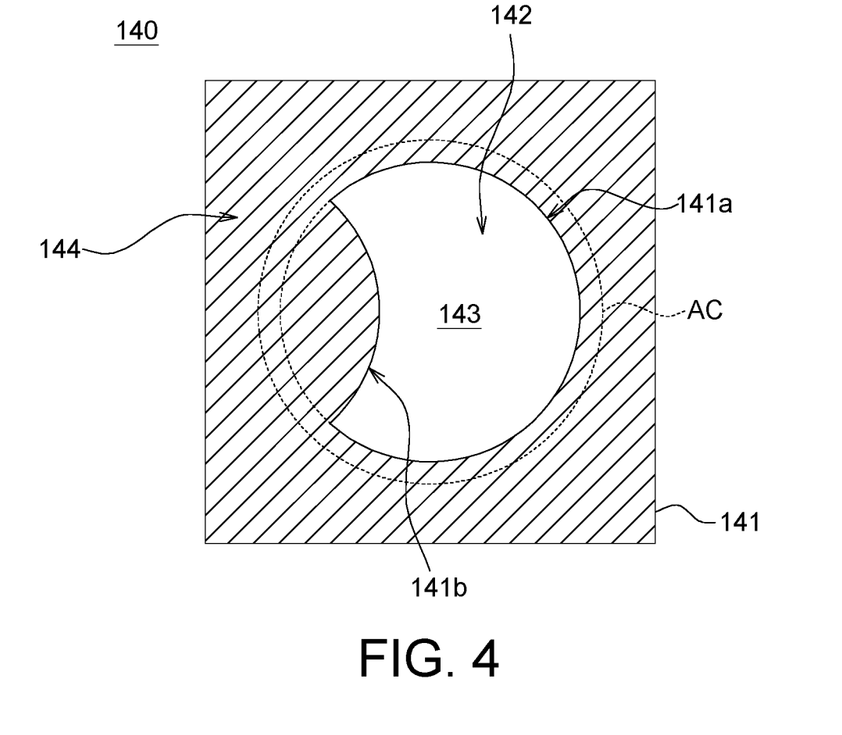
FIG. 4 is a schematic diagram of a light-adjusting diaphragm element of the projection system according to an embodiment of the present invention.
Figure 5:
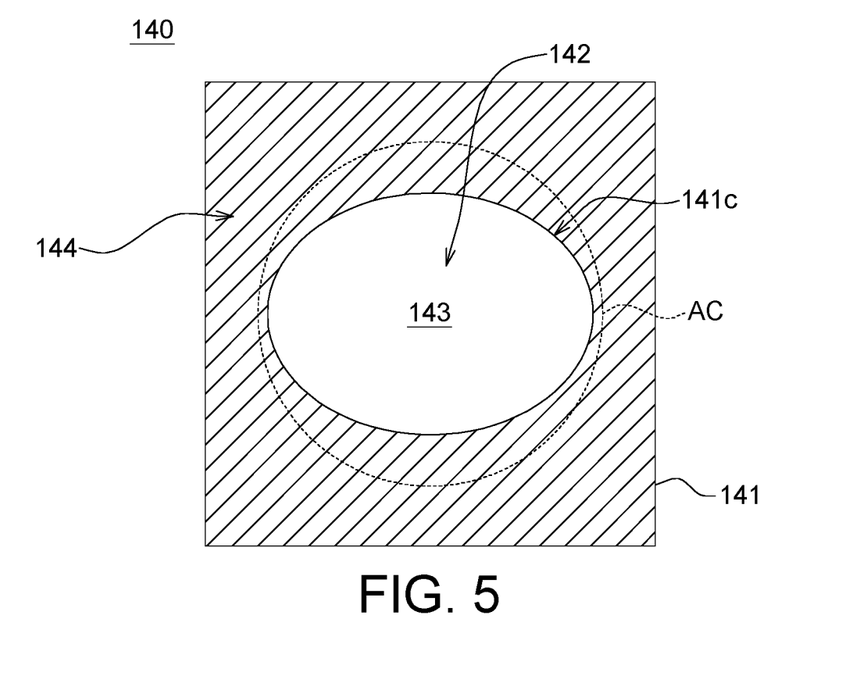
FIG. 5 is a schematic diagram of a light-adjusting diaphragm element of the projection system according to another embodiment of the present invention.

Referring to FIGS. 4 and 5, the light-adjusting diaphragm element 140 for example is composed of a whole piece of filter element 141. A light shielding area 144 is formed on the filter element by a shielding method, and only the opening 142 is remained for light transmission. For example, the light shielding area 144 is coated, evaporated, or bonded with an opaque material. The opaque material for example is a black flat varnish. Or, in another embodiment, the light-adjusting diaphragm element 140 for example is a light opaque metal element. The opening 142 is formed by punching the metal element, and the filter 143 is mounted into the opening 142 by an embedding method. As shown in FIGS. 4 and 5, the light-adjusting diaphragm element 140 has an opening 142 and a light shielding area 144 outside the opening 142, a filter 143 is disposed in the opening 142, and the light shielding area 144 may block a part of input light (the dotted line area represents the cross-section contour AC of the input light), so that a part of the input light may pass through the opening 142. The filter 143 may be a part of the whole piece of filter element 141, or may only be an element embedded in the opening 142. In present embodiment, the cross-section diameter of the input light is greater than the diameter of the opening 142.

Figure 1A:
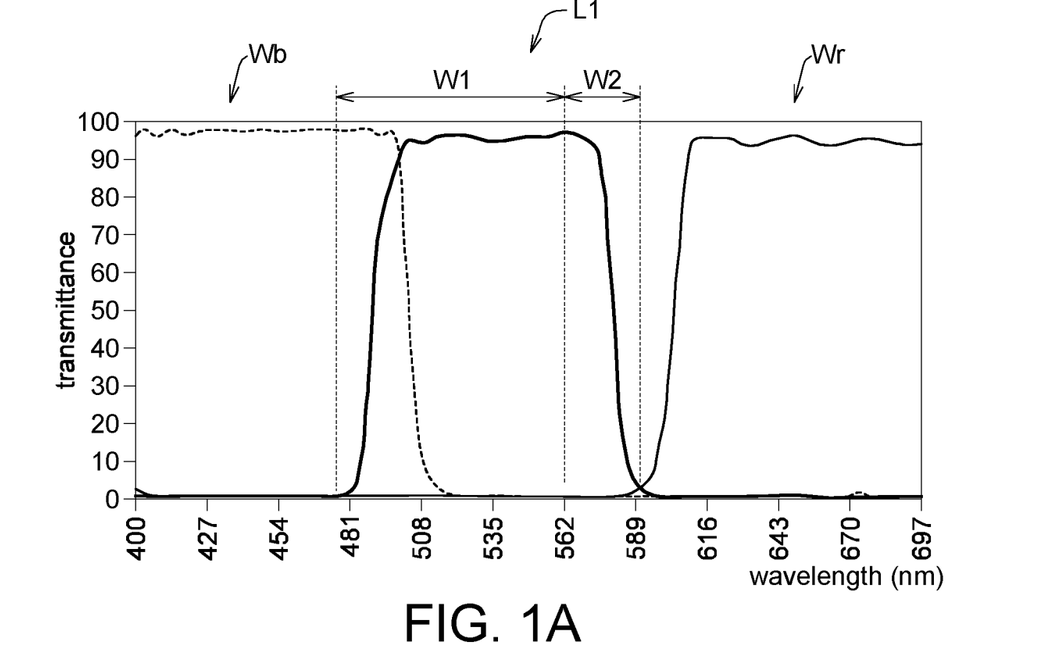
FIGS. 1A and 1B are respectively a schematic diagram of the transmittance of each color light wavelength.
Figure 1B:
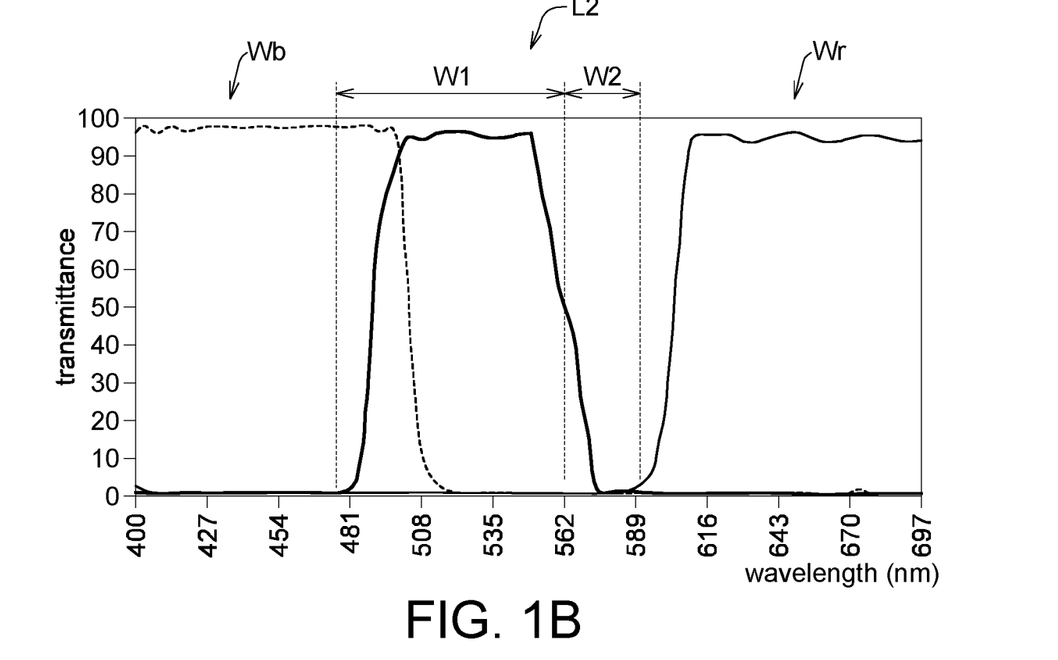

Referring to FIGS. 1A and 1B, which respectively show schematic diagrams of the transmittance of each color light wavelength, wherein a first light L1 emitted from the light-emitting element comprises a first dominant wavelength range W1 and a second dominant wavelength range W2. In an embodiment, through the filter 143 of the light-adjusting diaphragm element 140, a wavelength band corresponding to the first dominant wavelength range W1 of the first light L1 emitted from the light-emitting element passes through the opening 142, and a wavelength band corresponding to the second dominant wavelength range of the first light L1 is blocked to become a second light L2, so that the second light L2 has a narrow wavelength range with respect to the first light L1.

In an embodiment, the first dominant wavelength range W1 for example is a 550 nm wavelength range which represents a green light wavelength, and the second dominant wavelength range W2 for example is a 570 nm wavelength range which represents a yellow light wavelength. A green light wavelength band corresponding to the first dominant wavelength range W1 is able to pass through the opening 142 of the light-adjusting diaphragm element 140, and the yellow light wavelength band corresponding to the second dominant wavelength range W2 is blocked by the filter 143 and is reduced. Therefore, the projection system 100 can output the purified green light wavelength band precisely to approach the true color performance, and further achieve the wide color gamut demand of the DCI-P3 color gamut standard specification. Without a doubt, the projection system 100 of the present invention is not limited to purifying the input light of the green light wavelength, the input light of a blue light wavelength band Wb or a red light wavelength band Wr may also be purified.

Referring to FIGS. 2A and 2B, which respectively show schematic diagrams of a projection system 100 according to two embodiments of the present invention. The projection system 100 for example comprises a light source 110, a filter device 112, a light pipe 114, at least a condensing lens 116, a reflecting mirror 118, a DMD 120, a projection lens 130, and a light-adjusting diaphragm element 140. As shown in FIG. 4, the light-adjusting diaphragm element 140 has an opening 142 and a light shielding area 144 outside the opening 142. The shape of the opening 142 for example is circle, and the edge of the opening 142 for example has a concave contour 141b (see FIG. 4) or a ring contour 141c (see FIG. 5), to block a part of the first light L1. The light-adjusting diaphragm element 140 is disposed between the light source 110 and the projection lens 130. The position of the light-adjusting diaphragm element 140 for example is at an A position in FIG. 2A or at a B position in FIG. 2B.

The light source 110 is used to emit a visible light L (e.g., a white light or a monochromatic light). The projection lens 130 is disposed on the path of the first light L1, and the visible light L may be filtered by the filter device 112 (e.g., a filter wheel or a filter) and become a first light L1 (a first color light), so that the first light L1 (the first color light) of the visible light L passes through and enter the light pipe 114, and is adjusted by the condensing lens 116, the reflecting mirror 118, and the DMD120 to reach the projection lens 130, to form an image light required for the projection. Without a doubt, the light source 110 can also emit the first light L1 (the first color light) without passing through the light pipe 114 or the filter device.

As shown in FIGS. 1A and 1B, the first light L1 has a first dominant wavelength range W1 and a second dominant wavelength range W2. The wavelength band corresponding to the first dominant wavelength range W1 of the first light L1 may pass through the opening 142 of the light-adjusting diaphragm element 140, and the wavelength band corresponding to the second dominant wavelength range W2 of the first light L1 is blocked to become a second light L2, so that the second light L2 has a narrow wavelength range with respect to the first light L1.

In an embodiment, the light pipe 114 is disposed between the light source 110 and the projection lens 130, and the light pipe 114 is used to limit the first light L1 to the light path leading to the projection lens 130. The condensing lens 116 is disposed between the light pipe 114 and the DMD 120. The reflecting mirror 118 is disposed between the condensing lens 116 and the DMD 120, and the reflecting mirror 118 is used to reflect the first light L1 or the second light L2 to the DMD 120.

The DMD 120 is disposed on the light path leading the first light L1 or the second light L2 to the projection lens 130. The DMD 120 comprises multiple micro-mirror reflectors (not shown), and their angles are adjustable. The micro-mirror reflectors are used to reflect the first light L1 or the second light L2 to the projection lens 130 to become an image light, or the angles of the micro-mirror reflectors are adjusted to reflect the first light L1 or the second light L2 to the dark state light path, and thus does not output the image light.

The light-adjusting diaphragm element 140 is located on the diaphragm position behind the light pipe 114, that is, the light-adjusting diaphragm element 140 is at the diaphragm position between the light pipe 114 and the projection lens 130. For example, in FIG. 2A, the light-adjusting diaphragm element 140 is at the diaphragm position between the light pipe 114 and the reflecting mirror 118, or at the diaphragm position between two condensing lens 116. At least one condensing lens 116 is located between the light pipe 114 and the DMD 120. Or, in FIG. 2B, the light-adjusting diaphragm element 140 is at the diaphragm position between the DMD 120 and the projection lens 130.

Figure 3:
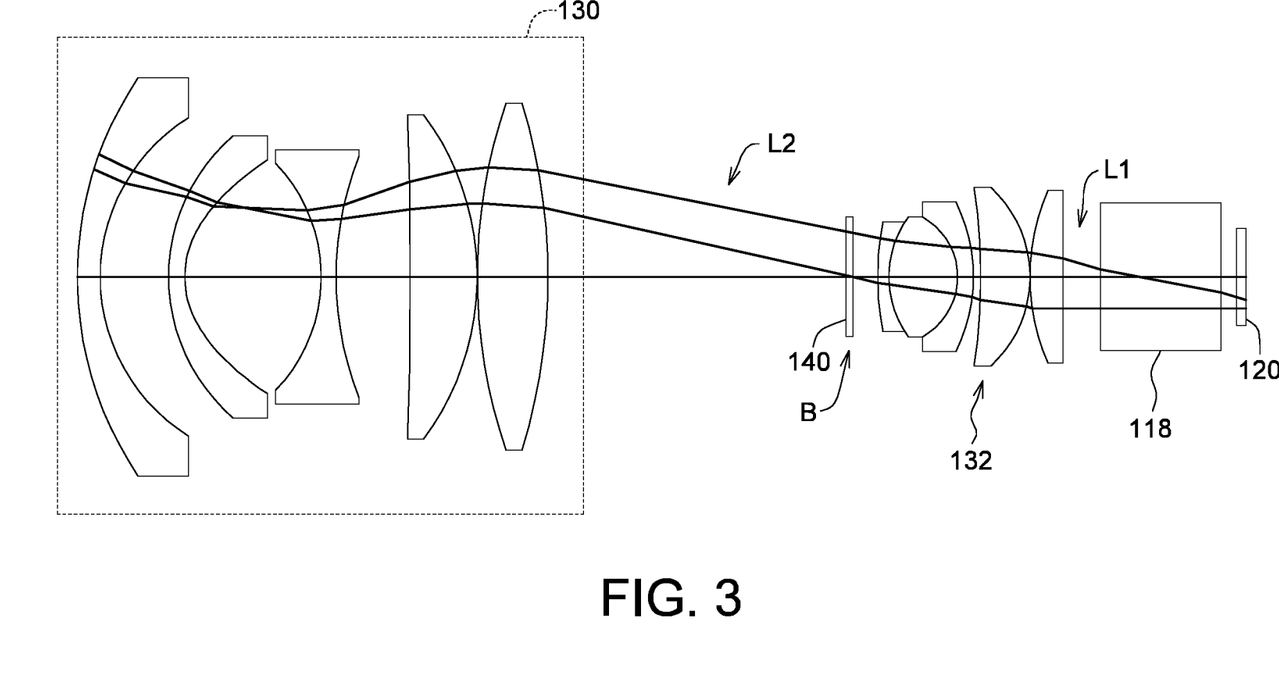
FIG. 3 is a schematic diagram of a light-adjusting diaphragm element according to another embodiment of the present invention.

Referring to FIG. 3, it is a schematic diagram of the position of the light-adjusting diaphragm element 140 according to another embodiment of the present invention.

In this embodiment, the projection system 100 may further comprise an imaging lens set 132 which is disposed between the projection lens 130 and the reflecting mirror 118. The light-adjusting diaphragm element 140 for example is located at the diaphragm position between the projection lens 130 and the imaging lens set 132, and the light-adjusting diaphragm element 140 may purify the first light L1 and block a part of the first light L1, so that the second light L2 passing through the opening 142 of the light-adjusting diaphragm element 140 has a narrow wavelength range.

The projection lens 130 aforementioned may be composed of at least one optical lens, and is used to adjust the image light outputted from the DMD 120 and projected on the screen. In addition, the projection system 100 of present invention has a case or a cover for receiving elements such as the light source 110, the filter device 112, the condensing lens 116, the light-adjusting diaphragm element 140, the reflecting mirror 118, the DMD 120, and the projection lens 130 aforementioned, and only the light output surface of the projection lens 130 is exposed on the case, so that the image light is projected outside the case.

Referring to FIG. 4, the opening 142 of the light-adjusting diaphragm element 140 is not limited to circle and can also be other geometric patterns, for example, a square opening, a rectangle opening, a drop shape, an oval shape, a diamond shape, a sector, or other shapes, etc. In addition, the opening 142 of the light-adjusting diaphragm element 140 has a convex contour 141a and a concave contour 141b, like a non-circular opening with crescent shape. In FIG. 4, the parts other than the opening 142 are all light tight.

Referring to FIG. 5, in another embodiment, the light shielding area 144 for example surrounds around the opening 142, so that the middle part becomes a light transmissive area of a circle, an oval shape, or other shapes. In FIG. 5, the parts other than the opening 142 are all light tight. The contour of the opening 142 is not limited to circle, and may be oval or other shapes.

The function of the light-adjusting diaphragm element 140 is similar to the combination of the diaphragm and the filter. The wavelength band corresponding to the first dominant wavelength range W1 of the first light L1 emitted from the light-emitting element (e.g., the 550 nm wavelength range of the green light wavelength) may pass through the opening 142 of the light-adjusting diaphragm element 140, and for example a wavelength band of the 570 nm wavelength range of yellow light wavelength is filtered out. Therefore, the projection system 100 disclosed in the above embodiments can output the purified green light wavelength band precisely to approach the true color performance, and further achieve the wide color gamut demand of the DCI-P3 color gamut standard specification.

In addition, the projection system 100 disclosed in the above embodiments can reduce the edge energy of a part of input light and form a dark field, and further improve the color contrast.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projection system, comprising:
a light source configured to emit a first light having a first dominant wavelength range and a second dominant wavelength range;
a projection lens disposed on path of the first light; and
a light-adjusting diaphragm element disposed between the light source and the projection lens, the light-adjusting diaphragm element has a filter and a light shielding area, the light shielding area is formed on an edge of the filter by coating, evaporating or bonding with an opaque material, wherein a part of the first light is blocked by the light shielding area, a wavelength band corresponding to the first dominant wavelength range of other part of the first light passes through the filter, and a wavelength band corresponding to the second dominant wavelength range of the other part of the first light is blocked by the filter to become a second light, so that the second light has a narrow wavelength range with respect to the first light.

2. The projection system of claim 1, wherein the light source is used to emit a visible light, and the projection system further comprising a filter device used to filter the visible light, so that the first light of the visible light passes through the filter device.

3. The projection system of claim 2, further comprising a light pipe used to limit the first light to the light path leading to the projection lens, wherein the light-adjusting diaphragm element is located between the light pipe and the projection lens.

4. The projection system of claim 3, further comprising a DMD disposed on the light path leading the first light or the second light to the projection lens, the DMD comprises a plurality of micro-mirror reflectors, wherein the light-adjusting diaphragm element is located between the light pipe and the DMD or between the DMD and the projection lens, the projection system further comprising at least one condensing lens and a reflecting mirror, the at least one condensing lens are disposed between the light pipe and the DMD, the reflecting mirror is disposed between the at least one condensing lens and the DMD, to reflect the first light or the second light to the plurality of micro-mirror reflectors, wherein an angle of the first light or the second light emitted to the plurality of micro-mirror reflectors is adjustable.

5. The projection system of claim 1, wherein a shape of the filter of the light-adjusting diaphragm element is a circle.

6. The projection system of claim 5, wherein an edge of the circle filter of the light-adjusting diaphragm element has a concave contour.

7. The projection system of claim 1, wherein the light shielding area surrounds the filter, so that a middle part of the filter becomes a light transmissive area of a circle or an oval shape.

8. The projection system of claim 6, wherein the light-adjusting diaphragm element is composed of a whole piece of a filter element.

9. The projection system of claim 7, wherein the light-adjusting diaphragm element is composed of a whole piece of a filter element.

10. A projection system, comprising:
a light source configured to emit a first light having a first dominant wavelength range and a second dominant wavelength range;
a projection lens disposed on path of the first light; and
a light-adjusting diaphragm element disposed between the light source and the projection lens, the light-adjusting diaphragm element has an opening and a light shielding area outside the opening, wherein a part of the first light is blocked by the light shielding area, a wavelength band corresponding to the first dominant wavelength range of other part of the first light passes through the opening, and a wavelength band corresponding to the second dominant wavelength range of the other part of the first light is blocked by the filter to become a second light, so that the second light has a narrow wavelength range with respect to the first light, wherein the light-adjusting diaphragm element is composed of a whole piece of a filter element, and the light shielding area is formed on the filter element by a shielding method, and only the opening is remained for light transmission.

11. A projection system, comprising:

a light source configured to emit a first light having a first dominant wavelength range and a second dominant wavelength range;

a projection lens disposed on path of the first light; and a light-adjusting diaphragm element disposed between the light source and the projection lens, the light-adjusting diaphragm element has an opening and a light shielding area outside the opening, a filter is disposed in the opening, wherein a part of the first light is blocked by the light shielding area, a wavelength band corresponding to the first dominant wavelength range of other part of the first light passes through the opening, and a wavelength band corresponding to the second dominant wavelength range of the other part of the first light is blocked by the filter to become a second light, so that the second light has a narrow wavelength range with respect to the first light, wherein the filter is mounted into the opening by an embedding method.

* * * * *